Dec. 25, 1962 W. I. L. WU 3,070,754
SIGNAL GENERATOR UTILIZING PLURAL OSCILLATORS
WITH PLURAL CRYSTALS
Filed Feb. 24, 1960
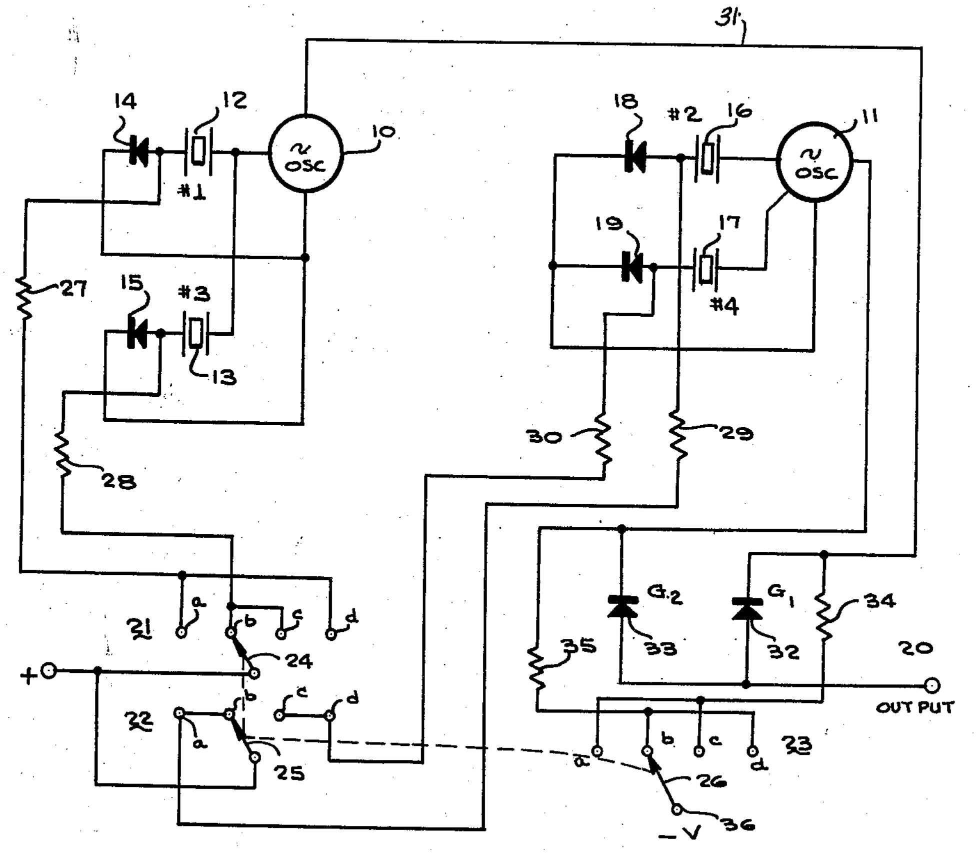
INVENTOR.
WILLIAM I. L. WU
BY Hurvitz & Rose
ATTORNEYS United States Patent Office 3,070,754

Patented Dec. 25, 1962

3,070,754

SIGNAL GENERATOR UTILIZING PLURAL OSCILLATORS WITH PLURAL CRYSTALS

William I. L. Wu, New Rochelle, N.Y., assignor, by mesne assignments, to The Singer Manufacturing Company, a corporation of New Jersey Filed Feb. 24, 1960, Ser. No. 10,659

9 Claims. (Cl. 331—49)

The present invention relates generally to signal generators, and more particularly to multiple frequency signal generators employing multiple frequency-control elements per oscillator, and multiple oscillators, as a signal source.

Where a large number of discrete, precisely defined frequencies is required to be generated selectively at will, a variety of possible procedures is available. Multiple frequencies may be derived from relatively few precisely controlled oscillators, by heterodyning, for example. Such systems are inevitably complex. The brute force method may be employed of providing a separate complete oscillator for each desired frequency, but this method is uneconomical when a large number of frequencies is required. It is also feasible to provide a relatively small number of oscillators, each of which may be selectively associated with a plurality of frequency control elements at will. Such systems are relatively economical for oscillators, but involve two serious problems. One problem is that leak-through exists to the output circuit of the system of the outputs of other oscillating systems than the one desired, if the selective switching system is to be relatively simple. A further problem is that considerable time may be required for an oscillator to become stable, after it is associated with a frequency selective circuit, where the oscillators employ high Q frequency control elements, such as piezo-electric crystals. It follows, that switching through a sequence of output frequencies may involve an undue time period.

In accordance with the present invention, multiple oscillators are associated each with multiple piezo-electric crystal frequency determining elements, at will. Each oscillator may be selectively gated to an output circuit, rather than switched, so that mechanical switching of A.C. signals is avoided. At radio frequenceis such switches tend to be both leaky and noisy. The piezo-electric crystal frequency control devices for the oscillators are likewise gated into circuit with the active elements of the oscillators to avoid R.F. switching. The gates may all be turned on or off selectively in response to D.C. control voltages, which materially simplifies switching, noise and leakage problems in the system.

The problem remains that as each piezo-electric crystal is associated operatively with an active oscillator element, a considerable time is required for the oscillator to attain a stable state, because of the high Q and consequent long oscillation build up time of such crystals. To avoid delays in switching from one frequency to another, the switches are arranged, as they are manipulated through a sequence, to select active elements in sequence, i.e., never to gate to the output circuit two frequencies in succession which derive from the crystals associated with the same active element. The switching system is also arranged to associate the proper succeeding crystal in circuit with the next succeeding active element while the preceding oscillator is alone connected to the output circuit of the system. Thereby, the oscillations next scheduled to be gated to the output circuit become stable and of full amplitude prior to being so gated, and without involving idle time for the system.

For the sake of simplicity of exposition, the system is described as employing two active elements, each associated with two crystals, so that a total of four frequencies is available from the system. It will be obvious to those skilled in the art to extend the concepts and structures described to more complex systems having any desired number of active elements and any desired number of crystals per active element. It will also be appreciated that the active elements employed may be either transistors or vacuum tubes, and that the mode of associating the active elements with the crystals to provide operative oscillators may be selected from the teachings of the prior art.

It is, accordingly, a broad object of the present invention to provide a novel multiple frequency signal generator.

It is a further object of the invention to provide a system for selectively generating multiple frequencies at will, which utilizes plural active elements to form plural oscillators, each active element being operatively associated with plural frequency control elements, at will.

It is another object of the present invention to provide a novel system of multiple signal generation by plural multiple tuned oscillators, wherein oscillators are selected in succession in a switching sequence and wherein a tuned circuit is operatively associated with the oscillator next in sequence to be connected to the output path of the system while the preceding oscillator is still connected to the output path.

A further object of the invention resides in the provision of a multiple frequency signal generator, in which multiple generators are electrically gated selectively to an output circuit and in which resonant frequency control circuits are selectively electrically gated into operative relative with each generator, whereby mechanical switching of high frequencies is avoided.

It is another object of the invention to tune an oscillator selectively to any one of a plurality of different frequencies by selectively gating tuned circuits into operative relation to the oscillators.

The above and still further objects, features and advantages of the present invention will become apparent upon consideration of the following detailed description of one specific embodiment thereof, especially when taken in conjunction with the accompanying drawings, wherein:

The single FIGURE of the drawings is a schematic circuit diagram of a system according to the invention.

Referring now to the drawings, the reference numeral 10 denotes an active element of a first oscillator, and the reference numeral 11 the active elements of a second oscillator. Such active elements are conventionally vacuum tubes or transistors. The active element 10 is operatively associated with two piezo-electric crystals 12 and 13, each via a diode gate, which are identified by reference numerals 14 and 15. The active element 11 is operatively associated with piezo-crystals 16, 17, each in series with a diode gate, which are identified by reference numerals 18, 19. The active elements 10 and 11 are associated with voltage supplies, bias resistances, isolating capacitors and the like, in configuration adapted to the specific circuitry required to provide an oscillator when a crystal is in circuit therewith which oscillates at the resonant frequency of the crystal.

The crystals 12, 13 are hereafter denominated No. 1 and No. 3 respectively, and the crystals 16, 17, No. 2 and No. 4 respectively, since it is desired to provide at an output lead, 20, frequencies in sequence equal to the frequencies of crystals No. 1, No. 2, No. 3, No. 4, No. 1, No. 2 . . . in that order.

Three four-position switches are provided, denominated 21, 22, 23, and having movable switch arms 24, 25, 26, respectively, which are ganged. The contacts of each of the several switches, taken in order, are identified by the subscripts *a, b, c, d*.

Contact 21*a* is connected to the anode of diode 14 via a resistance 27, contact 21*b* to the anode of diode 15 via resistance 28, contact 21*a* to contact 21*d*, and contact 21*b* to contact 21*c*.

Contacts 22*a* and 22*b* are connected together and via resistance 29 to the anode of diode 18 and contacts 22*c* and 22*d* via resistance 30 to the anode of diode 19.

A source of positive gate voltage is connected to switch arms 24 and 25. The cathodes of the several diodes 12, 13, 18, 19 are connected back directly to the associated active elements 10, 11. As the switch arms 24 and 25 select switch positions, *a, b, c, d*, in sequence, then, the crystals are gated on in the sequence

| Switch contact: | Crystal |
|---|---|
| *a* | No. 1, No. 2. |
| *b* | No. 2, No. 3. |
| *c* | No. 3, No. 4. |
| *d* | No. 4, No. 1. |

so that two crystals are always operative in circuit to determine oscillator frequency, the selected two being in sequential order and associated with different oscillator active elements.

The switch 23 is employed selectively to gate output from active elements 10, 11, to output lead 20. To this end, the output of oscillator 10 proceeds via lead 31 to the cathode of gate diode 32, and the output of oscillator 11 to the cathode of gate diode 33. The anodes of diodes 32, 33 are connected to output lead 20. The cathode of diode 32 proceeds via resistance 34 to contacts *a* and *c* of switch 23, and the cathode of diode 33 via resistance 35 to contacts *b* and *d* of switch 23. A negative voltage terminal 36 is connected to movable arm 26 of switch 23. Accordingly, the diode gates comprising diodes 32 and 33, denominated $G_1$ and $G_2$, respectively, are opened in the order below recited, as switch arm 26 moves over switch contacts *a, b, c, d*, in the recited order

| Switch contact: | Gate open |
|---|---|
| *a* | $G_1$ |
| *b* | $G_2$ |
| *c* | $G_1$ |
| *d* | $G_2$ |

The following table coordinates the operative crystals with the oscillators connected to output lead 20, and with switch positions:

| Switch position | Gate | Crystal |
|---|---|---|
| *a* | $G_1$ | No. 1, No. 2. |
| *b* | $G_2$ | No. 2, No. 3. |
| *c* | $G_1$ | No. 3, No. 4. |
| *d* | $G_2$ | No. 4, No. 1. |

Describing the operation of the system, for the *a* position of the switches, oscillator 10 is gated to output lead 20, crystal No. 1 determining frequency, while oscillator 11 is oscillating under control of crystal No. 2, but is disconnected from output lead 20.

For switch position *b*, oscillator 11 is connected to output lead 20 and is oscillating under control of crystal No. 2, while oscillator No. 1 is disconnected from output lead 20 and is oscillating under control of crystal No. 3.

For switch position *d*, the oscillator 11 is connected to output lead 20, and is oscillating under control of crystal No. 3, while oscillator 11 is disconnected from output lead 20 and is oscillating under control of crystal 14.

For switch position *d*, the oscillator 11 is connected to output lead 20 and is oscillating under control of crystal No. 4, while oscillator 11 is disconnected from output lead 20 and is oscillating under control of crystal No. 1, preparatory to selection of switch contact *a*.

It is not essential to the system that it be limited to any specific number of oscillators, or any specific number of crystals per oscillator, or that the number of crystals per oscillator be equal to the number of oscillators. The system may be generalized on the basis that if the outputs of the oscillators be gated to an output in order *m, n, o, p . . . m, n, o, p . . .*, and if each oscillator be operatively associated with a plurality of crystals which may be gated one at a time into operative relation with the oscillator, in a sequence identified by numeral sub-scripts, the crystals are connected to the oscillators in the normal order of the sub-scripts as the switches step, so that one, or more, or all crystals associated with the oscillators not connected to the output are nevertheless connected with the crystals which provide the next required frequencies from these oscillators. Each oscillator is thereby stable at full amplitude of output prior to the time it is connected to the output, having been previously conditioned while the preceding oscillator of the sequence was connected to the output.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A first oscillator, a second oscillator, means for tuning said first oscillator selectively to a first and a second frequency, means for tuning said second oscillator selectively to a third and a fourth frequency, means for connecting said first and second oscillator to an output terminal in alternation in the order first, second, first, second, means operative in the recited order for tuning said first and second oscillator to said first and third frequencies, respectively, while said first oscillator is connected to said output terminal, means for tuning said first and second oscillators to said second and third frequencies respectively while said second oscillator is connected to said output terminal, means for tuning said first and second oscillators to said second and fourth frequencies while said first oscillator is connected to said output terminal and means for tuning said first and second oscillators to said first and fourth frequencies while said second oscillator is connected to said output terminal.

2. In combination, a plurality of oscillators, a different plurality of oscillatory circuits associated with each one of said plurality of oscillators, a multi-position ganged switch, means operative for successive positions of said switch for gating the outputs of said oscillators in sequence one at a time to an output circuit in repeated cycles, each of said cycles including all said oscillators, means for gating into each oscillator a different one of the associated oscillatory circuits during each of said cycles, said last means being arranged to be operative for each oscillator while that oscillator is not gated to said output circuit.

3. In a signal generator, a first oscillator, a second oscillator, said first oscillator having a first ordered plurality of regenerative feed-back circuits, said second oscillator having a second ordered plurality of regenerative feed-back circuits, first means for gating on said first ordered plurality of regenerative feed-back circuits selectively one at a time, second means for gating on said second ordered plurality of regenerative feed-back circuits selectively one at a time, an output circuit, and third means for gating the outputs of said first and second oscillators selectively to said output circuit.

4. The combination according to claim 3 wherein said third means is arranged to gate said first and second oscillators or in alternation and said first and second means are arranged to gate on said first and second ordered pluralities of feed-back circuits in order simultaneously so that the oscillators next to be gated on shall have its regenerative feed-back circuit gated on immediately preceding the latter gating on.

5. A plurality of oscillators, an output terminal, means for gating the outputs of said oscillators to said output terminal in sequence one at a time, each of said oscillators being tunable step-wise over a range, said means comprising a sequentially operative multi-position switch operative to gate a different one of said oscillators for each switch position, and means operative at each position of said multi-contact switch for conditioning the oscillator operative in response to the next succeeding switch position to be oscillatory and to tune the latter oscillator to a frequency one step advanced in said range.

6. In combination, a plurality of oscillators, a voltage responsive normally closed gating circuit associated with each of said oscillators, a gating voltage source, a multi-position switch for conveying said gating voltage source to said gating circuits in sequence one at a time to translate said gating circuits one at a time to ON gate condition, a separate gating array for varying the output frequency of each of said oscillators step-wise over a frequency range and a separate switch for selecting the gates of each of said gating arrays.

7. The combination according to claim 6 wherein said multiposition and separate switches are arranged in each position to gate only one oscillator to an output terminal and simultaneously to prepare at least one further oscillator for connection to said output terminal by rendering said at least one further oscillator oscillatory at a predetermined frequency.

8. The combination according to claim 6 wherein each oscillator is associated with a plurality of discrete tuning circuits, and wherein each of said separate gating arrays is arranged to gate said discrete tuning circuits one at a time into operative relation with its associated oscillator.

9. A signal generator, comprising a plurality of oscillators *a*, *b*, . . ., each of said oscillators having selectively associable tuned circuits $a_1$, $a_2$ . . ., $b_1$, $b_2$, . . ., $c_1$, $c_2$, . . ., where the letter identifies the oscillator and the sub-script identifies the tuned circuits, means for repetitively connecting said oscillators to an output circuit in order *a*, *b*, . . ., *a*, *b*, . . ., *a*, *b*, . . ., means for effecting operative connection of said tuned circuits to each of said oscillators in the normal order of said subscripts for succeeding connections of each oscillator to said output terminal, said last means being operative for each oscillator while the oscillator last preceding in order *a*, *b*, . . ., *a*, *b*, . . . is connected to said output circuit.

References Cited in the file of this patent

UNITED STATES PATENTS

| | | |
|---|---|---|
| 2,790,906 | Hammond | Apr. 30, 1957 |
| 2,939,359 | Markowitz | June 7, 1960 |

FOREIGN PATENTS

| | | |
|---|---|---|
| 1,038,127 | Germany | Sept. 4, 1958 |